United States Patent
Won et al.

(10) Patent No.: US 7,328,616 B2
(45) Date of Patent: Feb. 12, 2008

(54) DIGITAL ANGULAR VELOCITY DETECTION DEVICE

(75) Inventors: Jong-hwa Won, Suwon (KR); Tikhov Yuri, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 279 days.

(21) Appl. No.: 10/962,562

(22) Filed: Oct. 13, 2004

(65) Prior Publication Data
US 2005/0076712 A1    Apr. 14, 2005

(30) Foreign Application Priority Data
Oct. 13, 2003    (KR) ..................... 10-2003-0071066

(51) Int. Cl.
*G01P 15/08* (2006.01)
*G01C 19/00* (2006.01)

(52) U.S. Cl. .................. 73/504.08; 73/504.11

(58) Field of Classification Search ............ 73/504.11, 73/504.08, 504.14, 504.12; 324/163, 176
See application file for complete search history.

(56) References Cited

U.S. PATENT DOCUMENTS

| | | | | | |
|---|---|---|---|---|---|
| 3,629,624 | A | * | 12/1971 | Staudte ........................ 310/309 |
| 4,435,702 | A | * | 3/1984 | Imai ............................ 340/671 |
| 4,839,646 | A | * | 6/1989 | Tyson ....................... 340/870.3 |
| 4,862,752 | A | * | 9/1989 | Hoyt ....................... 73/862.326 |
| 5,955,800 | A | * | 9/1999 | Shearwood et al. .. 310/40 MM |
| 5,965,968 | A | * | 10/1999 | Robert et al. ............... 310/310 |
| 6,076,401 | A | * | 6/2000 | Okada ...................... 73/504.12 |
| 6,507,016 | B1 | | 1/2003 | Cooper |
| 6,668,648 | B2 | * | 12/2003 | Karasawa et al. ........ 73/504.08 |

FOREIGN PATENT DOCUMENTS

| | | |
|---|---|---|
| DE | 3834200 A1 | 4/1990 |
| EP | 0270440 B1 | 6/1988 |
| EP | 1335187 A | 8/2003 |
| GB | 1302609 | 1/1970 |
| JP | 58-052566 A | 3/1983 |
| JP | 2-14311 A | 6/1990 |
| JP | 8-226826 A | 9/1996 |
| JP | 9-33210 A | 2/1997 |
| WO | 0120259 A | 3/2001 |

* cited by examiner

Primary Examiner—Helen Kwok
(74) Attorney, Agent, or Firm—Sughrue Mion, PLLC

(57) ABSTRACT

A digital angular velocity detection device, including a stat or formed on a substrate. A rotor operable to rotate in response to an external force is provided. The rotor has a plurality of electrodes formed at regular intervals on a curve at a predetermined radius away from a center of the rotor. A detector having detection electrodes facing the plurality of electrodes is provided. The detection electrodes are operable to detect a rotation frequency of the rotor based on a number of electrostatic capacitance variations generated between the plurality of electrodes and the detection electrodes.

5 Claims, 5 Drawing Sheets

DIGITAL ANGULAR VELOCITY DETECTION DEVICE

CROSS-REFERENCE TO RELATED APPLICATIONS

This application claims the benefit of Korean Application No. 2003-71066, filed Oct. 13, 2003, in the Korean Intellectual Property Office, the disclosure of which is incorporated herein by reference.

BACKGROUND

1. Field of the Disclosure

The present disclosure relates to a digital angular velocity detection device that uses a micro electro mechanical system (MEMS).

2. Description of the Related Art

A general digital angular velocity detection device such as a gyroscope measures rotational frequency with respect to a rotation direction of an object, and is usually used in the navigation devices in a ship or an aircraft. The gyroscope measures the angular velocity based on a principle that a Coriolis force is applied vertically to the rotation direction. Nowadays, as semiconductor technology is developed, the gyroscope has been produced using MEMS technology.

FIG. 1 explains the operation principle of a micro gyroscope using the general MEMS technology.

As shown in FIG. 1, the micro gyroscope is constituted by a vibratory mass 11, and a movable electrode 12 connected to the mass 11. This causes variations in the electrostatic capacitance with a fixed electrode 13 as a rotation force is applied to the mass 11 in a vertical direction to the vibration thereof. An elastic member 14 is connected between the movable electrode 12 and the fixed electrode 13. A housing 10 supports the fixed electrode 13.

If the rotation force is applied from the outside when the mass 11 vibrates, the Coriolis force is given in a vertical direction to the rotation force. When the Coriolis force is given in a direction "F", a distance between the movable electrode 12 and the fixed electrode 13 decreases. This reduction in distance generates a variation of the electrostatic capacitance there between. The micro gyroscope measures variation of the angular velocity by converting the electrostatic capacitance variation to a voltage variation.

However, the above-structured micro gyroscope needs to keep the mass 11 vibrating continually for the measurement of the angular velocity variation. Therefore, if the rotation force is not applied from the outside, the vibration of the mass 11 itself can cause a measurement error. Further, in order to generate and measure the capacitance variations between the movable electrode 12 and the fixed electrode 13, the distance between the-movable electrode 12 and the fixed electrode 13 needs to be as short as possible. On the other hand, a contact area therebewteen should be large. Such a requirement complicates the structure of the three-dimensional electrode and the fixed electrode.

FIG. 2 shows a related art structure of the electrodes constituting the micro gyroscope of FIG. 1.

As shown in FIG. 2, in the conventional micro gyroscope, the distance between the movable electrode 12 and the fixed electrode 13 is very short to guarantee sufficient capacitance between them. Further, the movable electrode 12 and the fixed electrode 13 are disposed very high from a semiconductor substrate. The manufacturing process to make such a three-dimensional structure using semiconductor technology is very complex. Moreover, it is hard to keep the distances between the movable electrode 12 and the fixed electrode 13 regular.

SUMMARY

The disclosed teachings are aimed at overcoming some of the problems in related art. Accordingly, it is an aspect of the disclosed teachings to provide a micro gyroscope having a simple structure and an improved accuracy.

The disclosed teachings provide a digital angular velocity detection device, comprising a stator formed on a substrate. A rotor operable to rotate in response to an external force is provided. The rotor has a plurality of electrodes formed at regular intervals on a curve at a predetermined radius away from a center of the rotor. A detector having detection electrodes facing the plurality of electrodes is provided. The detection electrodes are operable to detect a rotation frequency of the rotor based on a number of electrostatic capacitance variations generated between the plurality of electrodes and the detection electrodes.

In an specific enhancement, the device further includes a ring-shaped first coil through which a pulse is applied from outside, and a second coil facing the first coil that has an induced pulse generated by an electromagnetic induction.

In another enhancement, a distance between the detection-electrodes follows the following equation:

$$d = \frac{1}{n} \times A$$

wherein, d is a distance between the detection electrodes, n is the number of the electrodes per unit length, and A is a distance between the electrodes.

In another specific enhancement, the plurality of electrodes are connected to each other by a conducting wire and the plurality of electrodes connected by the conducting wire is operable to generate the induced pulse on the second coil.

In yet another specific enhancement, the stator, the rotor, and the detector are formed on a semiconductor substrate.

Another aspect of the disclosed teachings is a digital angular velocity detection device comprising a rotation board rotatably mounted at a predetermined distance above a semiconductor substrate, and having a plurality of holes located at regular intervals on a curve. A light beam projection device projects a beam of light to the plurality of holes. A detector detects a rotation frequency of the rotation board based on a number of brightness changes occurring due to the rotation of the rotation board.

In a specific enhancement the light beam projection device is disposed on a line linking parts of the curve, and has a plurality of light beam projectors for projecting the beam.

In another specific enhancement, the light beam projectors are disposed at predetermined intervals on the line.

More specifically, the interval follows the following equation:

$$d = \frac{1}{n} \times A$$

wherein, d is a distance between the light beams, n is the number of the holes per unit length, and A is a distance between the holes.

BRIEF DESCRIPTION OF THE DRAWINGS

These and other features, aspects, and advantages of the disclosed teachings will become better understood with regard to the following description, appended claims, and accompanying drawings where:

DETAILED DESCRIPTION

Hereinafter, the disclosed teachings will be described in detail with reference to the accompanying drawings.

Figure 1:
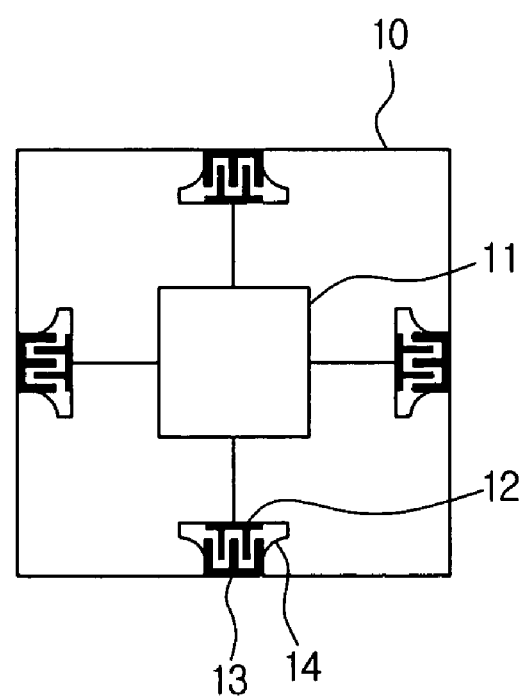
FIG. 1 explains the operation principle of a micro gyroscope in the related art.
Figure 2:
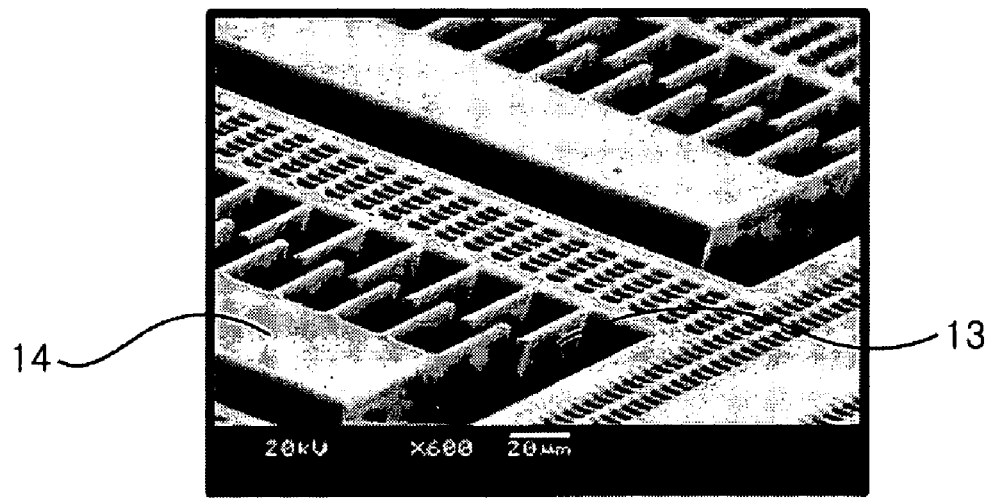
FIG. 2 shows electrodes constituting the micro gyroscope of FIG. 1.
Figure 3A:
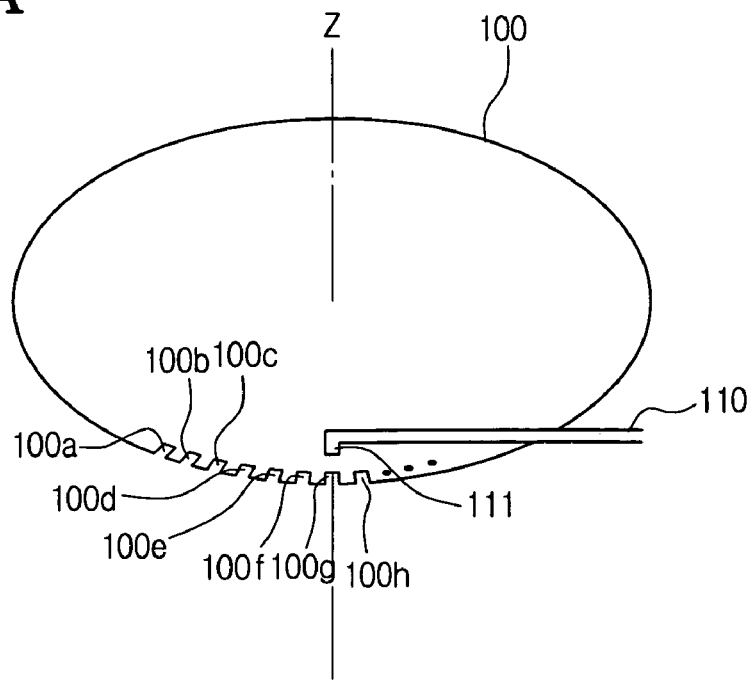
FIGS. 3A and 3B explain a basic concept of a digital gyroscope embodying aspects of the disclosed teachings.
Figure 3B:
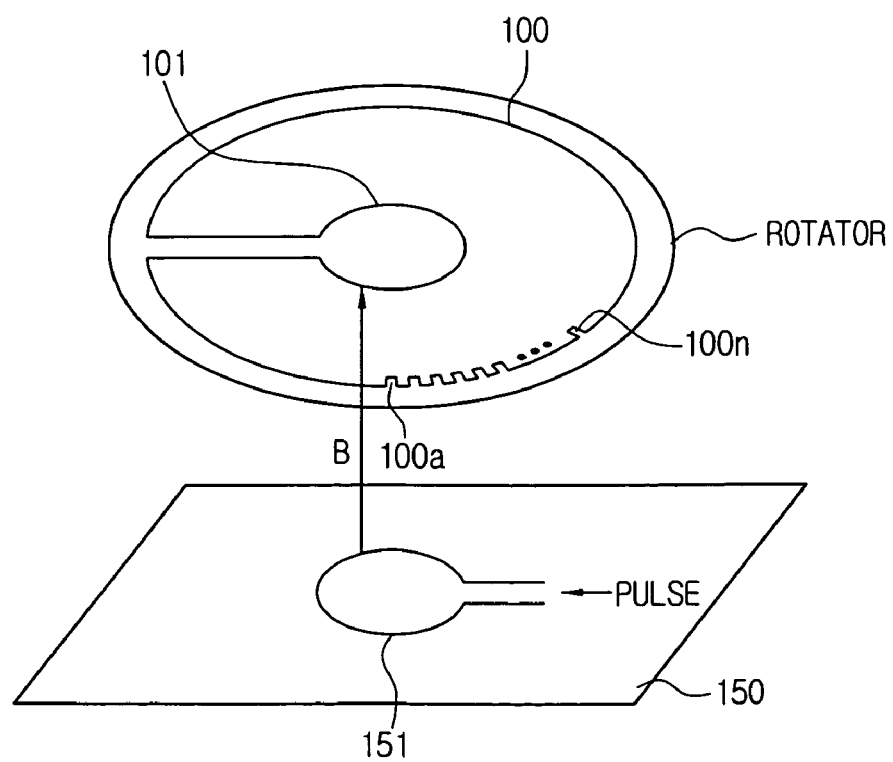

FIGS. 3A and 3B explain a basic concept of a digital gyroscope embodying aspects of the disclosed teachings.

Referring to FIG. 3A, a plurality of electrodes 100a to 100n, which are electrically connected, are disposed at certain intervals on a copper wire which rotates in response to a rotation force applied from the outside. A detector 110 is provided opposite to the electrodes 100a to 100n. The electrodes 100a to 100n are formed toward the detector 110 having a saw teeth part to generate variations of the electrostatic capacitance when the electrodes 100a to 100n neighbors the detector 110.

Every time the-electrodes 100a to 100n rotate and pass by the detector 110, the electrostatic capacitance variation occurs between the detector 110 and any one of the electrodes 100a to 100n. The detector 110 detects the rotation frequency by counting the number of the variations. Although not shown, the digital gyroscope may comprise an angular velocity calculation circuit that calculates the angular velocity by converting the detected rotation frequency to a rotation frequency per a certain time unit.

FIG. 3B shows an exemplary embodiment of the digital gyroscope according to the basic concept of FIG. 3A.

The illustrated digital gyroscope comprises a rotor and a stator 150. The stator 150 comprises a first coil 151 for sending a pulse applied from the outside. The rotor comprises a second coil 101 facing the first coil 151. A conducting wire 100 connects the electrodes 100a to 100n and the second coil 101.

The pulse sent to the first coil 151 induces a pulse at the second coil 101 of the rotor by an electromagnetic induction. The pulse induced to the rotor is applied to the respective electrodes 100a to 100n that are connected through the conducting wire 100. Therefore, the rotor does not need a separate structure to apply a pulse from the outside. Accordingly, the structure is simplified, thereby increasing the reliability increases.

Figure 4:
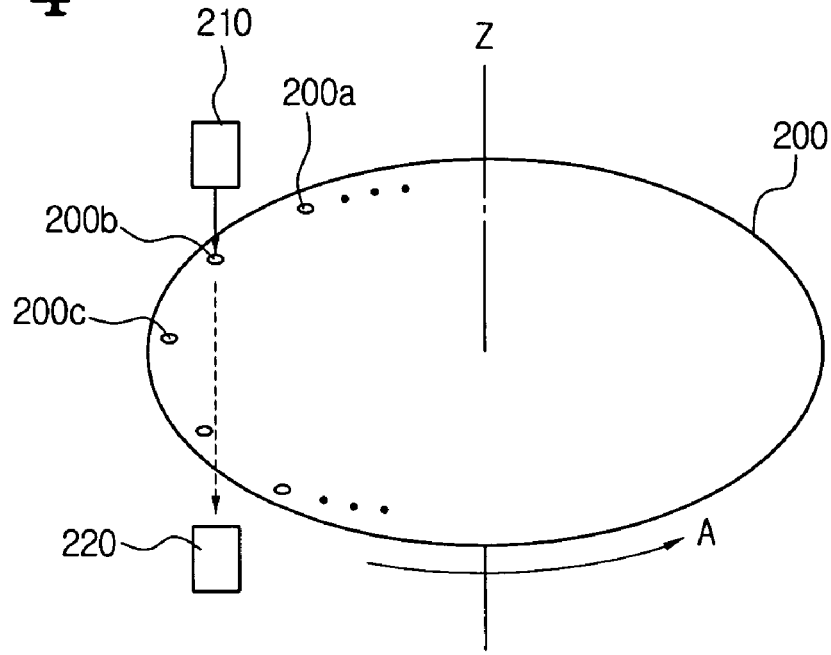
FIG. 4 shows another exemplary embodiment, embodying some aspects of the disclosed teachings.

FIG. 4 shows another exemplary embodiment of the disclosed digital gyroscope.

The digital gyroscope in FIG. 4 detects the rotation frequency using a photo detection method. It comprising a rotation board 200 with holes 200a to 200c formed at certain intervals in the exterior of the rotation board 200. A light beam projection device 210 projects a beam to the holes 200a to 200c. A detector 220 detects the light beam projected from the light beam projection device 210 to any one of the holes 200a to 200c.

As illustrated in FIG. 4, when the rotation board 200 rotates in a direction "A", the light beam projected from the light beam projection device 210 penetrates one of the holes 200a to 200c. The detector 220 detects the rotation frequency of the rotation board 200 based on the number of brightness changes occurring due to the rotation of the rotation board 200. The detector 220 may be a photo detector such as a phototransistor or a photodiode, which is capable of detecting the beam.

Figure 5:
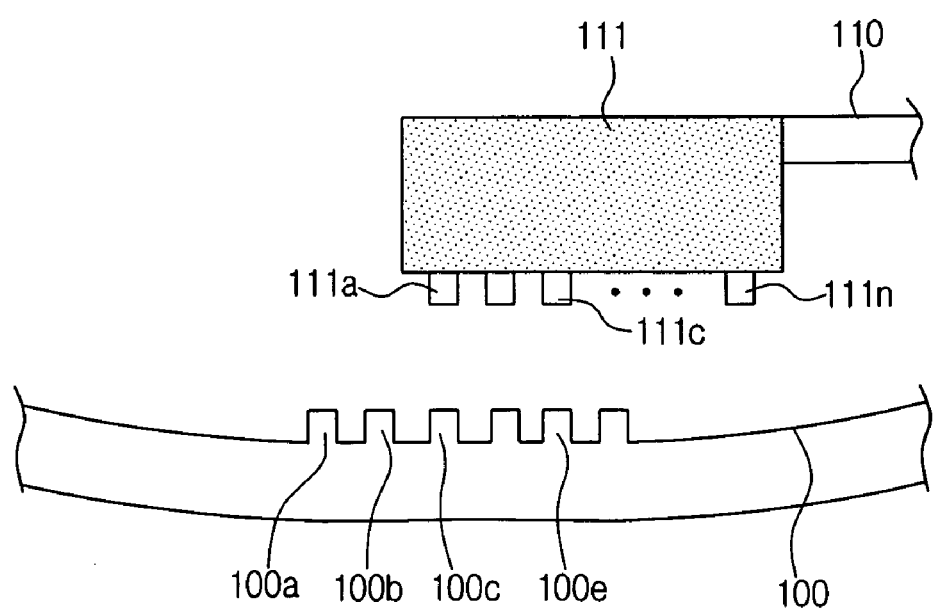
FIG. 5 shows a detailed structure of the digital gyroscope of FIG. 3A.

FIG. 5 is a detailed view of the structure of the digital gyroscope of FIG. 3A.

As shown in FIG. 5, electrodes 100a to 100n are disposed on a portion at a predetermined radius away from a center axis Z of the rotor. The electrodes 100a to 100n are electrically connected. A detector 110 is formed at an upper part of the rotor. A head 111 is formed at an end of the detector 110, and has a plurality of detection electrodes 111a to 111n to face one of the electrodes 200a to 200c. Distances between the respective detection electrodes 111a to 111n are more than distances between the respective electrodes 100a to 100n. As a result, the detection electrodes 111a to 111n are not aligned with the electrodes 100a to 100n altogether when the rotor rotates in the direction "A".

Figure 6:
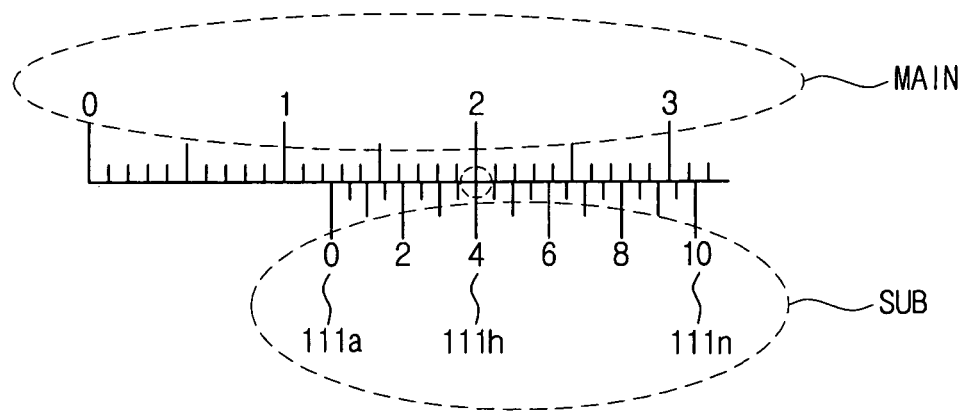
FIG. 6 explains a principle for calculating a rotation frequency of a rotor by detection electrodes formed at a detector of FIG. 5.

FIG. 6 explains a principle for calculating a rotation frequency of the rotor 100 by detection electrodes 111a to 111n formed at a detector 110 of FIG. 5.

Main scale is illustrated on an upper part in FIG. 6, and sub scale is on a lower part. Numbers 1, 2, and 3 respectively represent 10, 20, 30 nm. The marks of the main scale are at 1 nm intervals. Setting 20 nm of the main scale as a unit, the sub scale is 19 nm in length. This is based on a Vernier Calipers' principle for measuring length of an object, wherein resolving power varies according to the number of the marks on the sub scale with respect to the unit length of the main scale. In FIG. 6, a 0-mark on the sub scale is between 12 nm and 13 nm on the main scale, and 4-mark on the sub scale is lined up with the 2-mark on the main scale. To read this according to the Vernier Calipers' principle, 12.4 nm is obtained. In other words, 10 times the resolving power of the main scale 1 nm can be obtained. Therefore, the number of the marks on the sub scale is increased per unit length to improve the resolving power of length to be measured. The interval between the sub scales can be calculated using an [Equation 1] below.

$$d = \frac{1}{n} \times A \qquad \text{[Equation 1]}$$

where, d represents a measured distance, n represents the number of marks on the main scale per unit length, and A represents an interval between the marks on the main scale.

Based on the Equation 1, the measuring method of the digital gyroscope of FIG. 5 is described as follows.

When the rotor rotates in the direction "A", the detection electrode 111a formed on the head 111 faces the electrode 100c. The electrostatic capacitance changes between the electrode 100c and the fixed electrode 111a. Here, if the number of the electrodes 100a to 100n per unit length is greater than the number of the fixed electrodes 111a to 111n, only one electrode such as 100e of the fixed electrodes 100a to 100n faces the fixed electrode 111c. By applying the above to[Equation 1], the rotation frequency of the rotor is calculated according to Equation 2 below.

$$d = \frac{1}{n} \times A \qquad \text{[Equation 2]}$$

where, d is a distance between the detection electrodes, n is the number of the electrodes per unit length, and A is a distance between the electrodes.

That is, the electrodes 100a to 100n of the digital gyroscope in FIG. 5 function as the marks on the main scale shown in FIG. 6, and the fixed electrodes 111a to 111n function as the marks on the sub scale.

Figure 7:
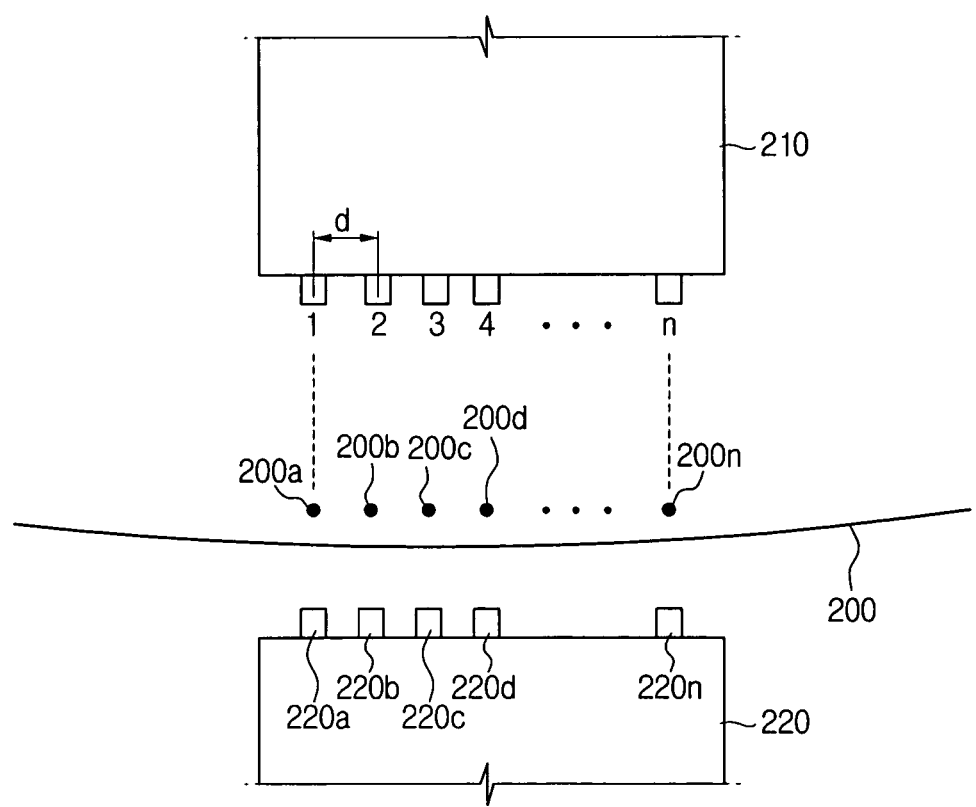
FIG. 7 shows a detailed structure of the exemplary digital gyroscope of FIG. 4.

FIG. 7 shows a detailed structure of the digital gyroscope of FIG. 4.

The digital gyroscope of FIG. 7 comprises a light beam projection device 210. A rotation board 200 rotates corresponding to the rotation force from the outside, and has holes 200a to 200n. A detector 220 detects the beam penetrated through the holes 200a to 200n. Light beam projectors 1 to n are provided at the light beam projection device 210, and detectors 220a to 220n are disposed to face each other. That is, when the beam penetrates through the holes 200a to 200n, one of the detectors 220a to 220n corresponding to the penetrated location reacts to the beam. Here, a distance between the light beam projectors 1 to n formed at the light beam projection device 210, and a distance between the grooves 200a to 200n per unit length formed at the rotation board 200 are calculated using an [Equation 3] below.

$$d = \frac{1}{n} \times A \qquad \text{[Equation 3]}$$

where, d is a distance between the beams, n is the number of the holes per unit length, and A is a distance between the grooves.

According to the [Equation 3], the holes 200a to 200n of the digital gyroscope function as the marks on the main scale of FIG. 6, and the detectors 220a to 220n function as the marks on the sub scale.

Therefore, the number of the holes in the digital gyroscope dose not have to correspond to the resolving power of the rotation board 200 to enhance the resolving power for the detection of the rotation frequency. Superior resolving power can be obtained by increasing the number of the light beam projectors 1 to n, and the number of the detectors 220a to 220n which detect the light beam projected from the light beam projectors 1 to n toward the rotation board 200.

As described above, the micro gyroscope using a MEMS technology does not require a complex structure for superior resolving power, therefore improving reliability of the structure and the resolving power. The angular velocity detection device of the above structure can be used for measuring distance as well as for detecting rotation frequency.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A digital angular velocity detection device, comprising:
a stator formed on a substrate;
a rotor operable to rotate in response to an external force, the rotor having a plurality of electrodes formed at regular intervals on a curve at a predetermined radius away from a center of the rotor;
a detector having detection electrodes facing the plurality of electrodes, the detection electrodes operable to detect a rotation frequency of the rotor based on a number of electrostatic capacitance variations generated between the plurality of electrodes and the detection electrodes,
wherein the distance between adjacent detection electrodes is larger than the distance between adjacent ones of the plurality of electrodes.

2. A digital angular velocity detection device, comprising:
a stator formed on a substrate;
a rotor operable to rotate in response to an external force, the rotor having a plurality of electrodes formed at regular intervals on a curve at a predetermined radius away from a center of the rotor;
a detector having detection electrodes facing the plurality of electrodes, the detection electrodes operable to detect a rotation frequency of the rotor based on a number of electrostatic capacitance variations generated between the plurality of electrodes and the detection electrodes;
a ring-shaped first coil through which a pulse is applied from outside; and
a second coil facing the first coil that has an induced pulse generated by an electromagnetic induction from the first coil to supply electrical energy to the plurality of electrodes on the rotor.

3. The digital angular velocity detection device of rotation-type of claim 1, wherein a distance between the detection-electrodes follows the following equation:

$$d = \frac{1}{n} \times A$$

wherein, d is a distance between the detection electrodes, n is the number of the plurality of electrodes per unit length, and A is a distance between the plurality of electrodes.

4. The digital angular velocity detection device of claim 2, wherein the plurality of electrodes are connected to each other by a conducting wire and the plurality of electrodes connected by the conducting wire is operable to generate the induced pulse on the second coil.

5. The digital angular velocity detection device of claim 1, wherein the stator, the rotor, and the detector are formed on a semiconductor substrate.

* * * * *